United States Patent [19]

Evans et al.

[11] 4,369,290

[45] Jan. 18, 1983

[54] AMINOMETHYL-PHENOL CROSS-LINKING COMPOUNDS

[75] Inventors: James M. Evans, Lynn Haven, Fla.; James T. K. Woo, Medina, Ohio

[73] Assignee: SCM Corporation, New York, N.Y.

[21] Appl. No.: 19,884

[22] Filed: Mar. 12, 1979

[51] Int. Cl.³ .................... C08L 63/00; C08L 61/34
[52] U.S. Cl. ................... 525/137; 204/14 R; 204/45 R; 427/13; 427/372.2; 523/406; 523/414; 525/136; 525/138; 525/142; 525/143; 525/480; 525/490; 525/523; 528/162
[58] Field of Search ............ 525/137, 138, 136, 143, 525/480, 490; 528/162; 427/13, 372.2; 204/14 R, 45 R

[56] References Cited

U.S. PATENT DOCUMENTS

| | | | |
|---|---|---|---|
| 3,476,697 | 11/1969 | Clements | 525/442 |
| 3,558,743 | 1/1971 | Verdol et al. | 260/23 R |
| 3,673,137 | 6/1972 | Palluel | 525/143 |
| 4,001,155 | 1/1977 | Kempter et al. | 525/490 |

*Primary Examiner*—Wilbert J. Briggs, Sr.
*Attorney, Agent, or Firm*—Thomas M. Schmitz

[57] ABSTRACT

Resinous coating compositions can be expediently heat cured by phenol compounds containing at least two methylene amine groups which are conjugated with the aromatic alcohol group or phenol group. The hydroxyl group substantially increase the reactivity of the aminomethyl functionality whereby active hydrogen containing resins can be effectively cross-linked.

7 Claims, No Drawings

AMINOMETHYL-PHENOL CROSS-LINKING COMPOUNDS

BACKGROUND OF THE INVENTION

This invention pertains to aminomethyl phenol derivatives for cross-linking active hydrogen containing resins and to a process for low-temperature heat curing such resins.

In the past, resinous coating compositions containing active hydrogens have been cured or cross-linked with low molecular weight resins or oligomers such as aminoplast resins, phenoplast resins, or resins containing oxirane or isocyanate groups as the cross-linking group.

It now has been found that active hydrogen containing resins can be efficiently cross-linked by heat curing in the presence of an aminomethyl phenol derivative to produce substantially improved cross-linked coatings exhibiting excellent chemical resistance along with other desirable film physical integrity properties. The phenol cross-linking derivative can be phenols, phenolic compounds or phenolic resins containing at least two methylene amine groups in conjugated positions relative to the phenol group or aromatic alcohol functional group on an aromatic ring based alcohol. When the aminomethyl substituted six membered aromatic rings contain a hydroxyl in the 2, 4, or 6 position in combination with two conjugated aminomethyl groups, the reactivity of the aminomethyl functionality to nucleophilic substitution is substantially increased to provide a remarkably active cross-linking mechanism for cross-linking resin coating compositions containing active hydrogens.

SUMMARY OF THE INVENTION

Briefly, the invention pertains to an active aminomethyl phenol derivative cross-linking agent containing an aromatic ring based alcohol having at least one free aromatic alcohol group in conjunction with at least two methylene amine group wherein the alcohol or hydroxyl group is conjugated with at least one and preferably both of the methylene amine groups. The process comprises heat curing active hydrogen containing coating resins and is particularly advantageous in cathodic electrocoating processes.

DETAILED DESCRIPTION OF THE INVENTION

This invention pertains to heat curing of active hydrogen containing coating resins by cross-linking such resins with an aminomethyl phenol derivative, or an aminomethyl phenol resin can be cross-linked with an active hydrogen resin.

Referring first to the cross-linking agent, the aminomethyl phenol derivative contains an aromatic ring based alcohol having at least one free aromatic alcohol or hydroxyl in combination with at least two methylene-amine groups. Preferably, both methylene-amine groups are in conjugation with the aromatic hydroxyl. For example, aminomethyl substituted six membered aromatic rings can contain a hydroxyl group in the 2, 4, or 6 ring position whereby the reactivity of the conjugated aminomethyl functionality to nucleophilic substitution is substantially increased. The aromatic ring alcohols containing at least two aminomethylene groups contain at least one aminomethylene group in the ortho or para ring position relative to the hydroxy group and can be generally illustrated by the following structural formulas.

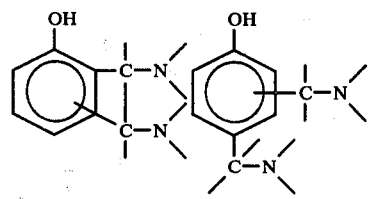

The activating effect of the hydroxyl group ortho or para to at least one aminomethylene group on the ring appears to result in activating the aminomethylene groups due to the oxygen electrons participating through conjugation interaction within the ring structure. Accordingly, the activated aminomethyl groups effectively cross-link active hydrogen containing polymers. The preferred aminomethylene cross-linking compound contains an ortho and a para aminomethylene group or two ortho aminomethylene groups.

The aminomethyl phenol derivatives can be produced by reacting phenol derivatives with primary or secondary amines together with an aldehyde or ketone. For instance, the aromatic hydroxyl component of the aminomethyl phenol can be a phenol having free ortho or para positions and can include phenol, phenolic compounds, phenolic resins, bisphenol A, bisphenol F, napthol compounds, biphenylol compounds, and similar phenol derivatives. For instance, the phenolic compounds can include bisphenols containing alkyl groups, oxy groups, sulfur or thio groups, sulfur dioxide, keto groups, and similar interconnecting groups between two phenols or phenol derivatives at the para ring position. Phenolic resins can be repeating polymer phenolic units interconnected at the ortho or para position. The phenol derivatives can further contain other substituents such as halogen groups. The phenol derivatives similarly can be fused ring napthols alone or interconnected to other phenol derivatives whereby the ortho or para positions remain open to interconnect with aminomethyl groups. The aminomethyl groups can be derived from aldehyde or ketones such as formaldehyde, acetaldehyde, propionaldehyde, butyraldehyde, isobutyraldehyde, and similar aliphatic aldehydes, benzaldehyde, tolualdehyde, cyclohexanecarbaldehyde and similar aromatic aldehydes, acetone, ethyl methyl ketone, isobutyl methyl ketone, and similar aliphatic ketones as well as aromatic ketones. Suitable amines include primary or secondary amines such as methylamine, dimethyl amine, ethylamine, diethylamine, propyl and dipropyl amines, butyl and dibutyl amines, and other alkyl and dialkyl amines, morpholine, N-methylpiperazine, pipiridine, pyrolidine as well as other aromatic primary or secondary amines. The aminomethyl phenol derivatives utilized as cross-linking compounds in accordance with this invention can be prepared by dissolving the phenolic derivative and the amine compound in a solvent and coreacting the same with a water solution of aldehyde or ketone. The reaction is generally exothermic and readily goes to completion to form an aminomethyl phenol according to the following reaction:

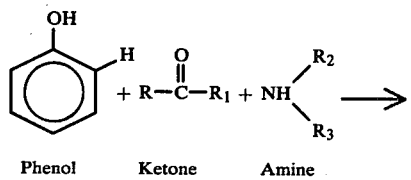

Phenol  Ketone  Amine

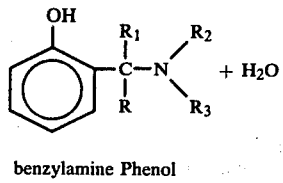

benzylamine Phenol wherein R, $R_1$, $R_2$, and $R_3$ are hydrogen, aliphatic hydrocarbon, or aromatic hydrocarbon, or combination thereof. The synthesis of aminomethyl phenol derivatives are further illustrated in the examples.

In accordance with this invention, aminomethyl phenol derivatives are utilized to cross-link active hydrogen containing polymers to provide cured thermoset polymer structures useful as protective surface coatings. Active hydrogen containing resins or polymers include polymer structures having amide groups

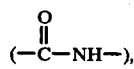

amine groups (—NH), carboxylic acids

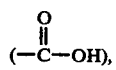

hydroxyl groups (—OH), and thiol groups (—SH). The polymer backbone structure is not critical provided the polymer contains active hydrogen groups. For example, the polymer backbone can be any primary or secondary amine containing polymers, epoxy polymers or copolymers, polyester copolymers, polyamide polymer and copolymers, polyurethane polymers and copolymers, vinyl or acrylic copolymer derived from copolymerized ethylenically unsaturated monomers. The active hydrogen groups can be grafted or copolymerized onto a polymer backbone to provide a polymer containing an active hydrogen and generally illustrated as polymer —AH wherein A is an electron withdrawing group and AH is an active hydrogen bearing group such as amide group

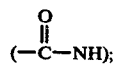

amine group

carboxylic acid group

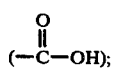

hydroxyl group (—OH); or thiol group (—SH). Typical polymer structures are further shown in the example. The coating composition desirably contains by weight between about 3% and 50% aminomethyl phenol derivative cross-linker and 50% and 97% active hydrogen polymer as well as other organic and inorganic additives such as plasticizers and pigments.

The coating composition of this invention comprising an aminomethyl phenol derivative for cross-linking the active hydrogen containing polymer can be cured at temperatures between about 200° F. and 350° F. although lower temperatures can be achieved if desired. Curing catalysts such as base materials can be added in minor amounts to accelerate the cross-linking reaction. The coating composition can be applied to various substrates such as wood, steel, aluminum, glass and plastic substrates. The coating can be applied by spraying, electrocoating, roller coating, dipping, brushing, flow coating, coil coating, and similar application methods.

The coating composition of this invention comprising an aminomethyl phenol derivative for cross-linking a polymer containing an active hydrogen is particularly suitable for cathodic electrocoating compositions. The coating composition provides good adhesion and excellent film properties in addition to enabling low temperature cures below about 350° F. and as low as room temperature in some combinations. Moderate heat cures are often desirable in electrocoating compositions to eliminate traces of residual water although prior art composition require undesirably high heat above 375° F. and often as high as 400° F. to 500° F. This invention for instance provides a substantial improvement over U.S. Pat. No. 4,001,155 which requires a hydroxy terminated phenol-amine derivative for cross-linking equivalent epoxide group during typical heat curing of 190° C. (374° F.). In contrast, this invention enables considerably lower heat cures which overcome the alkaline conditions of the electrocoated films to provide excellent chemical resistant cure films.

These and other advantages of this invention as well as the versatility of various compositions are further illustrated in the following examples.

EXAMPLE I

An aminomethyl phenol derivative cross-linker of a morpholine adduct of Bisphenol A was produced as follows:

228 gm. of Bisphenol A and 228 gm. of monobutyl either of ethylene glycol were charged into a round bottom flask. The mixture required heating up to about 60° C. before all the Bisphenol A dissolved. 348 gm. of morpholine was then added to the Bisphenol A solution, and the reaction mixture is now at 40° C. 324 gm. of a Formalin solution (37% in water) is then slowly added to the Bisphenol A-morpholine mixture. The reaction of morpholine-formaldehyde-Bisphenol A is exothermic and was kept at 40° C. The addition of the formalin solution took 3 hrs. After the Formalin addition, the hazy reaction mixture was held at 40° C. for 2 hrs., and then heated to 80° C. and held at 80° C. for ½ hr. The reaction mixture turned much clearer, and with the addition of another 185 gm. of the monobutyl ether of ethylene glycol, the reaction mixture became clear. The non-volatile is 45%. The viscosity of the solution of Al on Gardner scale.

EXAMPLE II

An adduct of dimethyl amine and Bisphenol A for use as a cross-linking agent was synthesized as follows:

570 gm. of Bisphenol A and 360 gm. methyl ethyl ketone were charged into a round bottom flask equipped with a condenser containing acetone—dry ice mixture. The Bisphenol A will dissolve in methyl ethyl ketone upon heating to 50°–60° C. The solution mixture is then cooled to 30° C. and 1800 gm. of dimethylamine (25% solution in water) was added to the Bisphenol A solution in about 1 hr. When 100 gm. of the dimethylamine was added, the solution became cloudy, but when more of the dimethylamine was added, the cloudy solution turned to a clear yellow solution. To this solution was added 330 gm. of paraformaldehyde (91% active) in ten increments. After the addition, the reaction mixture was heated to 80° C. and held at 80° C. for ½ hr. to insure complete reaction. The water and methyl ethyl ketone were then stripped off under vacuum and monobutyl ether of ethylene glycol was added so that final NV of the resultant product was 85%. The product was a thick liquid.

EXAMPLE III

An aminomethyl phenol cross-linking agent was synthesized as in Example II except the amine used was diethyl amine.

EXAMPLE IV

An aminomethyl phenol cross-linking agent was synthesized as in Example II except the amine used was diisopropylamine.

EXAMPLE V

An aminomethyl phenol cross-linking agent was synthesized as in Example II except the amine used was dibutylamine.

EXAMPLE VI

An aminomethyl phenol cross-linker based on Bisphenol A terminated epoxy resin and diethylamine was synthesized as follows:

A Bisphenol A terminated epoxy resin was made by reacting 400 gm. of DER 333 epoxy resin (1 mole) with 456 gm. (2 moles) of Bisphenol A at 170° C. 100 gm. of monobutyl ether of ethylene glycol was then added to decrease the viscosity, and the reaction mixture is also cooled to about 120° C. when 987 gm. of methyl ethyl ketone was slowly added. 292 gm. (4 moles) of diethylamine was then added to the Bisphenol A terminated epoxy resin to further cool the reaction mixture to about 40° C., before 132 gm. (4 moles) of paraform (91%) was added in 1 hr., the paraform being added in four equal portions. The reaction mixture was held at 40° C. for 4 hrs., and was clear and thin liquid. The reaction mixture was then heated to 80° C. and volatile taken off by vacuum. When the viscosity of the reaction mixture was getting thick, monobutyl ether of ethylene glycol was added to cut the viscosity. About 200 gm. of the monobutyl ether of ethylene glycol was added. The non-volatile of the final resin was 80% and was a fluid liquid.

EXAMPLE VII

Similarly to Example VI, an adduct based on phenolic resin and morpholine useful as a cross-linker was synthesized as follows:

510 gm. of phenolic resin BRNA-8371 (code name of Union Carbide), the structure of which was believed to be

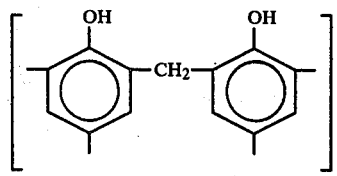

120 gm. of morpholine and
100 gm. of tetrahydrofuran, was heated to about 40° C. to achieve monogeneous solution. 100 gm. of a 37% Formalin solution was added dropwise to the phenolic resin solution. The reaction was exothermic and increased the temperature to 65° C. After the addition of the Formalin solution, the reaction mixture was heated to 85° C. and held for 2 hrs. During that time, most of the tetrahydrofuran was taken off and replaced by monobutyl ether of ethylene glycol so that the final resin non-volatile was 80%. It was a clear semi-viscous liquid.

EXAMPLE VIII

A self-curing active hydrogen resin was produced as follows:

(i) Preparation of ketimine derived from diethylenetriamine and methyl isobutyl ketone as follows. One mole of diethylenetriamine (206 gm.) and 800 gm. (8 moles) of methyl isobutyl ketone was heated to reflux in a round bottom flask and the azetrope (water-methyl isobutyl ketone) was taken off. When 64 gm. (4 moles) of water was collected, the reaction was stopped. About 400 gm. of the methyl isobutyl ketone was also taken off.

(ii) Preparation of adduct of ketimine derived from diethylenetriamine and methyl isobutyl ketone with an epoxy resin (DER664), epoxy equivalent weight of 900, Dow Epoxy Resin, Dow Chemical Company.

The ketimine solution (i) was heated to 150° C., and a resinous solution made of 1800 gm. of DER664 (1 mole) and 1200 gm. of xylene was slowly added to the ketimine solution. The addition took 3 hrs. During the addition, solvents were continually being removed. After the epoxy addition, the reaction mixture was held for 2 hrs. at 150° C., at which time the non-volatile of the resin was 81.5%. 470 gm. of monobutyl either of ethylene glycol was then added and the non-volatile is now 70%.

(iii) A self-curing resin was produced by reacting product of the above epoxy-ketimine adduct with 2, 4, 6-tris-dimethylamino methyl phenol (DMP-30, Rhom & Haas) as follows. To 372 gm. of the epoxy-ketimine adduct in (ii) was added 10 gm. of water and 35.9 gm. of lactic acid (88% active in water), and the resulting mixture was heated to 110° C., and held at that temperature for ½ hr., then it was cooled to 60° C. 30.8 gm. of DMP-30 was slowly added to the mixture, and held at 60° C. for an hour. During the hour hold, the reaction appears to be exothermic. After the hour hold, the reaction mixture was gradually heated to 95° C. and held at 95° C. for 3 hrs. The non-volatile at that stage was 72.5%.

(iv) A pigmented electrocoat bath was made and shown in the following:

| Resin in (iii) | 138 gm. |
|---|---|
| Hexyl Cellosolve ®* | 50 gm. |
| Deionized Water | 300 gm. |
| Clay (Burgess No. 10) | 7.0 gm. |
| Titanium Dioxide | 17.7 gm. |
| Carbon Black | 0.3 gm. |
| Deionized Water | 740 gm. |

*Hexyl Cellosolve ®* of Union Carbide; Monohexyl ether of ethylene glycol.

The bath NV was 10%, and EP-2 metal panels (zinc phsophated cold roll steel) was plated at the cathode at 1 amp. for one minute. The electrocoated panels were rinsed with water and baked at 300° F. for 20 minutes. A hard, solvent resistant coating was obtained. The coating had 100 methyl ethyl ketone double rubs, which indicates that the coating is well cured.

EXAMPLE IX (i) An adduct of DER-661 epoxy resin and ethylene diamine was produced as follows:

475 gm. (7.9 mole) ethylene diamine was charged into a reaction flask and heated to 90° C. 1660 gm. (1.6 mole) of DER-661 (Dow epoxy equivalent weight 475), dissolved in 560 gm. of xylene was slowly added to the diamine in a period of 2 hours, during that time, the temperature gradually climbed to 105° C. After the addition, the reaction mixture was held at 105° C. for 2 hrs. and the reaction mixture was vacuum stripped. The excess amine and xylene was stripped off at 30″ Hg and the reaction pot temperature was 115°-120° C. When the aminated epoxy was getting too high viscosity, xylene was added in order to cut the viscosity. It is important that no free ethylene diamine remain in the aminated epoxy, as presence of free amine will affect in plating characteristics of the resin during electrocoating. Towards the end of the stripping, monobutyl ether of ethylene glycol and monohexyl ether of ethylene glycol were added so that the final NV of the resin is 73%. To 1430 gm. of the above material was added 113 gm. of α-olefin epoxide (C-16 from Shell Oil Co.) and the resulting mixture was heated at 120° C. for 2 hrs. 214 gm. of monobutyl ether of ethylene glycol was added to the reaction mixture so that the NV now is 72%.

(ii) An electrocoat batch composition was made from the following:

| Above resin Ex. IX (i) | 100 gm. |
|---|---|
| DMP-30(2,4,6-tris dimethylamino methyl phenol) | 13.1 gm. |
| Surfynol 104 | 1.0 gm. |
| Hexyl Cellosolve ® | 8.3 gm. |
| Lactic Acid | 25.3 gm. |
| Deionized Water | 566.8 gm. |
| Titanium Dioxide | 18.7 gm. |
| Clay (Burgess No. 10) | 9.4 gm. |
| Carbon Black | 0.3 gm. |

Bath NV is 6% and pH is 6.5. Upon electrocoating at the cathode, tough, hard solvent resistant coatings were obtained. Curing of the coating is further demonstrated by making a solution shown in the following:

| Resin Ex. IX (i) | 49.6 gm. |
|---|---|
| DMP-30(2,4,6-tris dimethylamino methyl phenol) | 17.1 gm. |
| Monobutyl ether ethylene glycol | 40 gm. |
| Monohexyl ether ethylene glycol | 36 gm. |

The above solution has an NV of ~40%. Clear drawdown were made on steel panels and baked. The cure data is summarized in the following table:

TABLE I

Curing Data of Clear Drawdowns of DER-661 Ethylene Diamine Adduct and DMP-30

| Film Thickness | Bake | MEK Rubs |
|---|---|---|
| 0.2-0.3 | 350° F. 20' | 133 |
| 0.36-0.45 | 350° F. 20' | 100 |
| 0.6-0.7 | 350° F. 20' | 200+ |
| 0.26-0.34 | 300° F. 20' | 33 |

(iii) An electrocoat bath composition was made from the following:

| Ex. IX (i) Resin (72% NV) | 116.8 gm. |
|---|---|
| Crosslinker Ex. II, Adduct of Bisphenol A-Dimethyl Amine (85% NV) | 52.4 gm. |
| Lactic Acid (88%) | 34.5 gm. |
| Deionized Water | 1796.3 gm. |

The electrocoating was carried out at the cathode at 25 volts for 2 minutes, bath temperature was 75° F. Upon baking, the resultant coating was well cured as shown in the following table:

TABLE II

Curing of Clear Coating From DER-661 Ethylene Diamine Adduct with Bisphenol A Dimethylamine Adduct

| Bake | MEK Rubs |
|---|---|
| 275° F. 20 Mins. | 20 |
| 300° F. 20 Mins. | 200+ |

EXAMPLE X

A higher molecular DMP-30 type crosslinker was made by heating DMP-30 (100 gm.) and ethylene diamine 5.1 gm. in an open flask at 104° F. for ½ hr. An electrocoat bath was made from the following:

| Resin Ex. IX (i) | 20 gm. |
|---|---|
| High Molecular DMP-30 Crosslinker | 4 gm. |
| Lactic Acid | 6 gm. |
| Monobutyl Ether of Ethylene Glycol | 7 gm. |
| Deionized Water | 150 gm. |

Upon electrocoating at the cathode, a smooth, hard solvent resistant coating was obtained after baking at 300° F. for 15 minutes. The cured coating had 200+MEK rubs.

EXAMPLE XI (i) An adduct of DER-661 epoxy resin and dimethylaminopropylamine was produced as follows. 226 gm. (2.2 moles) of dimethylaminopropylamine was placed in a round bottom flask and heated to reflux 130° C. 1400 gm. (1 mole) of an epoxy resin solution DER-671-X75 (Dow epoxy resin DER-661, 75% NV in xylene) was slowly added to the refluxing amine. The addition took about 2 hrs. After the addition of the amine, the aminated epoxy solution was held at reflux for 2 hrs., and was then vacuum stripped very efficiently so that a sample of the resin showed absence of free amine by gas chromatography. 124 gm. of α-olefin epoxide (C-16 from Shell Oil Co.) and 280 gm. of monobutyl ether of ethylene glycol were slowly added to the aminated epoxy resin at 120° C. After the addition of the α-olefin epoxide and the cosolvent, the mixture was held at 120° C. for 2 hrs. The final resin nonvolatile was 80%.

(ii) Grind Composition.

| Resin Ex. XI (i) | 165 |
| Hexyl Cellosolve ® | 20 |
| Lactic Acid (88% in water) | 21.6 gm. |
| Surfynol | 5.9 gm. |
| Clay | 120.2 gm. |
| Titanium Dioxide | 314.4 gm. |
| Deionized Water | 300 gm. |

The above composition was mixed on a shaker mill until the Hegman fineness is 7 or better.

(iii) An electrocoat bath composition was made from the following:

| Resin Ex. XI (i) | 79.3 gm. |
| Crosslinker Ex. III | 24.5 gm. |
| Pine Oil | 4.1 gm. |
| Lactic Acid (80% in water) | 12.5 gm. |
| Deionized Water | 819.6 gm. |
| Grind Ex. XI (ii) | 60 gm. | pH bath 7.8. Specific conductance 4000 umho/cm. The above composition was electrocoated at the cathode at 150 V for 2 minutes to give smooth hard, solvent resistant coating as shown in the following table:

TABLE III

Curing of Coating From DER-661 - Dimethyl Aminopropylamine and Bisphenol A - Diethylamine

| Bake | MEK Rubs |
|---|---|
| 275° F. 20 Mins. | 75 |
| 300° F. 20 Mins. | 200+ |
| 325° F. 20 Mins. | 200+ |
| 350° F. 20 Mins. | 200+ (3H Hardness) |
| 375° F. 20 Mins. | 200+ |

The coating baked at 350° F. for 20 minutes passed 336 hrs. salt spray resistance and 240 hrs. of detergent resistance. The metal substrate used here was EP-2 (zinc phosphated cold roll steel).

(iv) An electrocoat bath composition was made from the following:

| Resin Ex. XI (i) | 89.5 gm. |
| Crosslinker Ex. I | 41.3 gm. |
| Lactic Acid (88% in water) | 7.2 gm. |
| Deionized Water | 862 gm. |

The bath nonvolatile was 10% and electrocoating at 200 volts for 2 minutes was carried out at the cathode with excellent shutdown properties. Smooth, hard solvent resistant coatings were obtained as shown in the following table:

TABLE IV

| Bake | MEK Rubs |
|---|---|
| 325° F. 20 Mins. | 10 |
| 350° F. 20 Mins. | 80 |
| 375° F. 20 Mins. | 200 |

The coating cured at 375° F. passed the 336 hrs. salt spray and 240 hrs. detergent resistance test.

EXAMPLE XII

To a 5-necked round bottom flask was charged 670 gm. butyl cellosolve (monobutyl ether of ethylene glycol). Through one neck was placed a water cooled condenser, through another's neck was placed an air driven mechanical agitator, a thermometer and an $N_2$ inlet was placed through the 3rd neck, and two monomer addition funnels were placed on the 4th and 5th neck. Through one monomer addition, funnel was added a mixture of 400 gm. styrene, 610 gm. butyl acrylate, 10 gm. benzoyl peroxide and through the other monomer addition funnel was added 150 gm. of acrylamide dissolved in 160 gm. of water. The monomers were added in about 4 hrs. at 100° C. After the monomer addition was complete, the reaction mixture was held at 100° C. for 1 hr., and 3 gm. of benzoyl peroxide was added. This process was repeated again after one hour. An hour after the second chaser, the nonvolatile was determined to be 58%. The polymerization is complete.

A curing study with and without cross-linker was as follows:

(a) Without cross-linker. A sample of this solution (60 gm. of polymer solution+40 gm. MEK) is drawn down a 4"×4" cold roll steel, and baked at 375° F. for 20 minutes. The cure is measured by the number of methyl ethyl ketone (MEK) rubs. This coating had only 3 MEK rubs.

(b) With cross-linker. The cross-linker used was the Cross-linker III, 70 NV in butyl cellosolve. To 60 gm. of the polymer solution was added 40 gm. of methyl ethyl ketone. 17 gm. of the cross-linker was then added. A coating was made on a 4"×4" cold roll steel and baked at 375° F. for 20 minutes. The resultant coating had 50 MEK rubs.

EXAMPLE XIII

A similar polymer was made like Example XII, except the composition is of the following:

| Butyl Cellosolve | 670 gm. |
| Styrene | 400 gm. |
| Butyl Acrylate | 610 gm. |
| Methacrylic Acid | 86 gm. |
| Benzoyl Peroxide | 10 gm. |
| Acrylamide | 150 gm. |
| $H_2O$ | 160 gm. |

The monomers were converted 100% by using 2 chasers of 3 gm. benzoyl peroxide each. A coating made from this polymer baked at 375° F. for 20 minutes had 3 MEK rubs. In contrast, a coating with cross-linker had excellent properties as follows. To 50 gm. of this polymer solution was added 50 gm. MEK. 14 gm. of the cross-linker (III) was also added. The coating from this composition after baking at 375° F. for 20 minutes had 100 MEK rubs.

EXAMPLE XIV

A hydroxyl active polymer contain an —OH was made from the following:

| 5% | RJ100 (a styrene-alkyl alcohol copolymer from Monsanto) | |
| 95% | Consisted of the following: | |
| | Styrene | 65% |
| | Butyl Acrylate | 20% |

-continued

| | |
|---|---|
| Hydroxyethylmethacrylate | 15% |

A coating made from the above composition after baking at 375° F. for 20 minutes had 5 MEK rubs.

With cross-linker: 30 gm. of resin was dissolved in 70 gm. of MEK by boiling the resin in MEK. Butyl cellosolve was added to adjust for the lost MEK. 14 gm. of the cross-linker (III) was added, and the resultant coating after baking at 375° F. for 20 minutes had 20 MEK rubs.

EXAMPLE XV

An active hydroxyl polymer was synthesized as follows:

An epoxy resin was made by reacting 274 gm. of DER333 and 138 gm. of Bisphenol A in 72 gm. of Butyl Cellosolve. The viscosity of the epoxy resin was $Z-Z_1$ as a 40% solution in Butyl Cellosolve ®. The oxirane value of the resin is 0.41. 47 gm. of Butyl Cellosolve ® and 102 gm. of n-Butanol were added to the epoxy resin, and the following monomer mixture was dropwise added to the epoxy resin solution at 120° C.

| | |
|---|---|
| Methacrylic Acid | 76.7 gm. |
| Styrene | 98.4 gm. |
| Ethyl Acrylate | 1.7 gm. |
| Benzoyl Peroxide | 12 gm. |

The addition took 2 hrs., and after the addition, the mixture was held at 120° C. for 3 hrs. At that time, the oxirane value of the resin was 0.25. The acid number of the resin is 84. The resin is ready for drop.

Drop: 1075 gm. of deionized water was heated to 80° C. and 40 gm. of dimethylethanol amine was added to the water just before adding the resin into water. An excellent stable emulsion was obtained. The nonvolatile of this emulsion is 30%. A coating made from this emulsion after baking at 375° F. for 20 minutes had 50 MEK rubs.

With cross-linker: To 100 gm. of the emulsion was added 14 gm. of the cross-linker Ex. III and the resultant coating after baking at 375° F. for 20 minutes had 150 MEK rubs.

The foregoing examples illustrate the merits of this invention wherein active hydrogen resins can be advantageously cross-linked by heat curing with aminomethyl phenol derivatives or resins. The examples are not intended to be limiting except by the appended claims.

We claim:

1. A heat curable coating thermosetting composition, comprising:
50% to 97% by weight of an active hydrogen polymer containing a polymeric structure having reactive hydrogen groups selected from amide groups, amine groups, or thiol groups; and
3% to 50% by weight of cross-linking aminomethyl substituted aromatic ring phenol derivative containing an aromatic ring, a free hydroxyl group attached to the aromatic ring, and at least two methylene amine groups attached to the aromatic ring wherein said hydroxyl group is conjugated with at least one of the methylene amine groups, said aminomethyl derivative being heat reactive whereby said conjugated methylene amine group is activated to cross-link with said reactive hydrogen polymer.

2. The composition in claim 1 wherein said aminomethyl phenol derivative contains two methylene amine located in conjugated relationship with said reactive free hydroxyl.

3. The composition of claim 1 wherein the aminomethyl phenol derivative is a phenol resin.

4. The composition in claim 1 wherein the active hydrogen polymer contains reactive amide group.

5. The composition of claim 1 wherein the active hydrogen polymer contains reactive amine groups.

6. The composition in claim 1 wherein the reactive hydrogen polymer contains reactive thiol groups.

7. In a process for providing a heat curable thermosetting surface coating composition for application onto a substrate and heat curing the coating composition, the improvement comprising:
providing a heat curable coating composition comprising by weight between about 50% and 97% of a reactive hydrogen containing polymer wherein said reactive polymer contains active hydrogen containing groups selected from amides, amines, hydroxyls, and thio groups, and between 3% and 50% of a cross-linking aminomethyl substituted ring phenol derivative containing an aromatic ring, a free hydroxyl group, and two methylene amine groups attached to the aromatic ring and at least one of said methylene amine groups is conjugated with said hydroxyl group and becomes heat reactive to cross-link with said reactive hydrogen polymer;
wherein said coating composition is heat cured at temperature above about 200° F. to cross-link the reactive hydrogen polymer with said aminomethyl phenol derivative by coreacting the reactive hydrogen with the conjugated aminomethylene group to form a cured surface coating on the substrate;
wherein the matrix polymer of said coating composition contains pendant amine groups which are neutralized by a proton donating solubilizing salt or acid for dispersing into said polymer and coating composition within water to form a dilute aqueous electrocoating solution, electrocoating a paint film onto a cathode substrate disposed within the electrocoating composition, and applying heat to cure the paint film onto the cathode substrate.

* * * * *